(12) United States Patent
Kim et al.

(10) Patent No.: US 6,233,388 B1
(45) Date of Patent: May 15, 2001

(54) POLYMER OPTICAL WAVEGUIDE AND METHOD FOR FABRICATING THE SAME

(75) Inventors: Eun-Ji Kim; Jung-Hee Kim, both of Seoul; Woo-Hyuk Jang, Yongin; Kwan-Soo Han, Seoul; Tae-Hyung Rhee, Sungnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,361

(22) Filed: Nov. 5, 1998

(30) Foreign Application Priority Data

Nov. 5, 1997 (KR) .................................. 97-58238
Nov. 2, 1998 (KR) .................................. 98-46821

(51) Int. Cl.$^7$ ...................................... G02B 6/13
(52) U.S. Cl. ...................... 385/143; 385/129; 385/145; 216/67
(58) Field of Search ................................. 385/123, 124, 385/127–132, 141, 143, 145

(56) References Cited

U.S. PATENT DOCUMENTS 5,649,045 * 7/1997 Fjare et al. ........................ 385/145
5,733,481 * 3/1998 Hayashida et al. .............. 385/143 X

* cited by examiner

Primary Examiner—John D. Lee
(74) Attorney, Agent, or Firm—Robert E. Bushnell, Esq.

(57) ABSTRACT

The present invention discloses a polymer optical waveguide and a method of fabricating the same. The polymer optical waveguide comprises a core formed of polymer containing fluoride (F) of a 12–37 wt % on the basis of total weight of the polymer, and having repeating units with at least two —C(=O)—N—C(=O) functional groups or at least four —N—C(=O)— functional groups; and a cladding in contact with the core and formed of polymer having a refractive index lower than the polymer for forming the core. If a core layer is etched according to the ICP etching method, the etch rate becomes at least three times faster than that of the conventional RIE etching method. Also, etching characteristics including uniformity of an etched plane and vertical profile are improved, thereby reducing damage to an optical waveguide. Thus, the light scattering loss of the optical waveguide can be minimized. Also, the method for fabricating of a polymer optical waveguide according to the present invention is useful for mass production of polymer optical waveguides.

18 Claims, 3 Drawing Sheets

POLYMER OPTICAL WAVEGUIDE AND METHOD FOR FABRICATING THE SAME

CLAIM OF PRIORITY

This application makes reference to, incorporates the same herein, and claims all benefits accruing under 35 U.S.C. §119 from an applications for POLYMER OPTICAL WAVEGUIDE AND METHOD FOR FABRICATING THE SAME earlier filed in the Korean Industrial Property Office on Nov. 5, 1997 and there duly assigned Ser. No. 58238/1997 and for POLYMER OPTICAL WAVEGUIDE AND METHOD FOR FABRICATING THE SAME earlier filed in the Korean Industrial Property Office on Nov. 2, 1998 and there duly assigned Ser. No. 46821/1998.

BACKGROUND OF THE INVENTION

1. Field of the Invention

The present invention relates to the class of devices known as optical waveguides and in particular to polymer optical waveguides for use in optical communication with near infrared light.

2. Description of the Related Art

In optical waveguides formed of an optical polymer which has low light loss in the optical communication wavelength region containing the near infrared region, it is necessary to minimize light scattering loss at the boundary between core and cladding of the waveguide. In order to minimize light scattering loss, when etching an optical waveguide it is imperative to appropriately control parameters such as the uniformity of a side wall of an etched waveguide, the vertical profile of the side wall and the etch rate. Since such parameters are directly affected by the plasma density and ion energy during etching and are optimized under contrary conditions, the plasma density and the ion energy must be independently controlled. Particularly, in the case of etching an optical waveguide formed of polymer containing halogen atoms, it is important to reduce damage in an optical waveguide by increasing the etch rate to minimize the exposure to the plasma. Again, it is necessary to independently control the plasma density and ion energy.

A general method for fabricating an optical waveguide will now be described. First, a lower cladding layer is formed on a substrate and then a core layer is formed on the lower cladding layer. Subsequently, a photoresist layer is formed on the core layer, exposed and then developed the resultant, to form a photoresist pattern. The core layer is etched using a photoresist pattern and then patterned. Then, an upper cladding layer is formed on the patterned core layer, thereby completing the optical waveguide.

As an etching method of the core layer, a reactive ion etching (RIE) method is widely used, in view of processing stability, preciseness and productivity. However, with the RIE method, the etch rate is very low, i.e., not more than 500 nm/min, which causes the substrate to be exposed to plasma for a long time to be damaged. In addition to damage to the etched plane, the vertical profile of the etched plane is nonuniform. And, in the case of increasing the plasma density for the purpose of enhancing the etch rate, the ion energy increases, which causes to damage the etched plane. Conversely, in the case of decreasing the plasma density for the purpose of reducing damage to the etched plane, the etch rate is lowered, and the substrate is exposed to the plasma for a long time, bringing about film damage.

Based on our observation of the art, we have observed that what is needed is a polymer optical waveguide which does not suffer from plasma damage during the manufacturing process. Specifically, a composition and a manufacturing method are needed which will allow a high etch rate without damage to the optical waveguide.

SUMMARY OF THE INVENTION

It is therefore an object of the present invention to provide an improved polymer optical waveguide.

It is also an object of the present invention to provide a polymer optical waveguide with minimal light scattering loss at the boundary between the core and the cladding.

It is a further object of the present invention to provide an improved method of making a polymer optical waveguide.

It is a still further object of the present invention to provide a method of making a polymer optical waveguide in which the etch rate of the core layer is high.

It is a yet further object of the present invention to provide a method of making a polymer optical waveguide in which the substrate is not damaged by the etching process.

It is a still yet further object of the present invention to provide a method of making a polymer optical waveguide in which the vertical profile of the etched plane is uniform.

It is another object of the present invention to provide a method of making a polymer optical waveguide in which the etched plane is not damaged by the etching process.

It is still another object of the present invention to provide a method of making a polymer optical waveguide in which the problems associated with too high or too low plasma density in the etching process are avoided.

To achieve the above objects, the present invention provides a polymer optical waveguide and a method for manufacturing this waveguide which minimizes damage to the optical waveguide during manufacture by improving the etch rate, uniformity, etching ratio and vertical profile of an etched plane of the optical waveguide. Specifically, in one aspect of the present invention, there is provided a polymer optical waveguide comprises a core formed of polymer containing fluorine (F) in amount of 12–37 wt % on the basis of total weight of the polymer, and having repeating units with at least two —C(=O)—N—C(=O) functional groups or at least four —N—C(=O)— functional groups, and a cladding in contact with the core and formed of polymer having a refractive index lower than the polymer for forming the core.

According to another of the present invention, there is provided a method for fabricating a polymer optical waveguide comprising the steps of:

forming a lower cladding layer on a substrate;

forming a core layer on the lower cladding layer;

patterning the core layer by etching the core layer in a predetermined pattern;

forming an upper cladding layer on the patterned core layer, wherein etching of the core layer is performed by an inductively coupled plasma (ICP) process on condition that ICP power and RF (radio frequency) chuck power are 170–750 W and 20–340 W, respectively, and the core layer is formed of a polymer containing fluorine (F) in amount of 12–37 wt % on the basis of total weight of the polymer, and having repeating units with at least two —C(=O)—N—C(=O) functional groups or at least four —N—C(=O)— functional groups.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
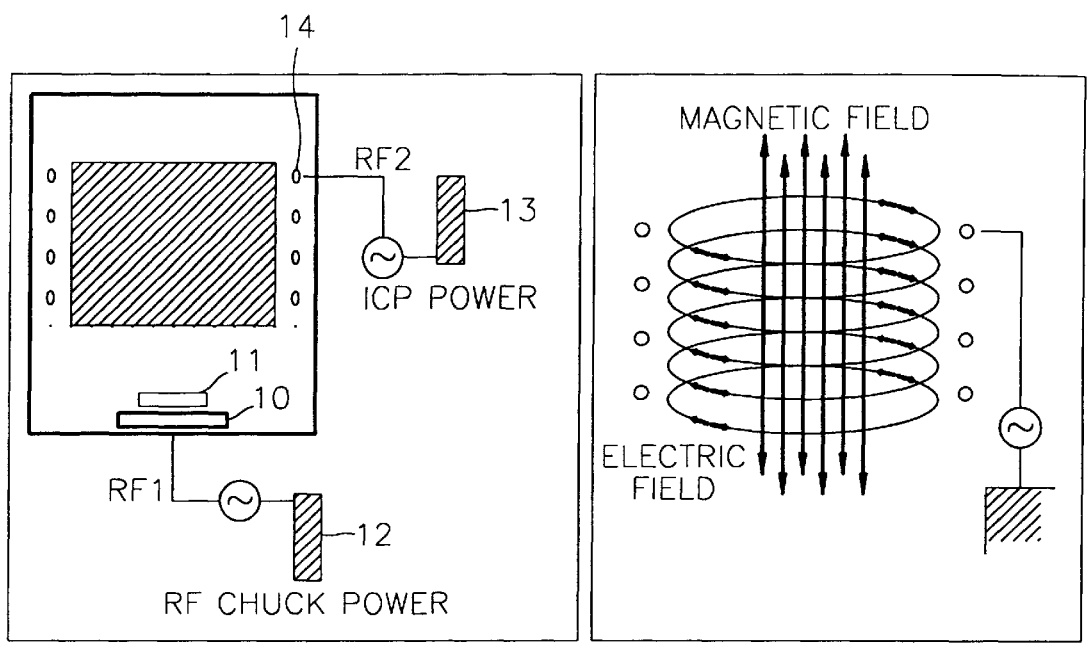
FIG. 1 is a conceptual diagram of an inductively coupled plasma (ICP) etching device used in the present invention.

A polymer optical waveguide of the present invention includes a core and a cladding in contact with the core. The core is formed of polymer containing within the range of approximately 12–37 wt % fluorine (F) on the basis of total weight of the polymer, and has repeating units with at least two —C(=O)—N—C(=O) functional groups or at least four —N—C(=O)— functional groups. The cladding is formed of polymer having a refractive index lower than of the core. In the polymer optical waveguide having the above-mentioned structure, light loss is low in the optical communication wavelength region containing the near infrared region, and light scattering loss at the boundary between a core and a cladding can be minimized.

Preferably, the polymer for forming the core is a compound represented by the formula 1 or 2, where, $n_1$ is an integer between 10 and 500, and $n_2$ is an integer between 10 and 500.

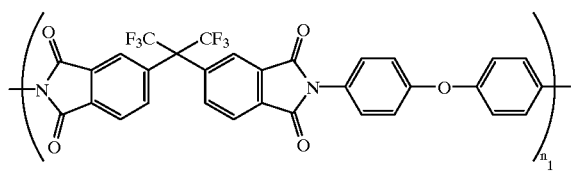

(1)

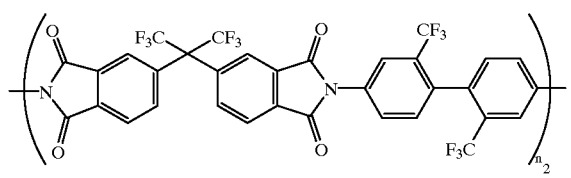

(2)

The method of fabricating the polymer optical waveguide of the present invention will now be described in detail with reference to the accompanying drawings. The method of fabricating the polymer optical waveguide of the present invention is characterized in that a core layer is etched by a inductively plasma (ICP) etching process under a predetermined ICP power and RF chuck power conditions. As a result, the etch rate becomes at least three times faster than that of the conventional method for etching core layer. Also, etching characteristics including uniformity of the etched plane and vertical profile of the etched plane are improved.

In an inductively coupled plasma (ICP) etching method, a non-polarized discharge plasma is generated by flowing current in a coil placed in a gas flow of an inert gas and an object disposed in the gas is etched. According to this method, since the plasma density and ion energy are independently controlled by using two RF power sources, the vertical profile, etch rate and uniformity of an etched plane of an optical waveguide can be optimized. Also, as an etching gas, only one kind of gas, i.e., oxygen gas or a mixed gas including oxygen and an inert gas such as helium, argon or nitrogen, can be used. In the case of using an inert gas such as helium, argon or nitrogen together with oxygen, the etch rate can be more easily controlled.

As a polymer for the polymer optical waveguide of the present invention, an optical polymer having low light loss in an optical communication wavelength region can be used. It is preferable to use a polymer having polyimide, polyetherimide, polyesterimide, polysulfoneimide or polyamideimide as a basic unit, containing in the range of approximately 12–37 wt % fluorine (F) on the basis of total weight of the polymer, and having repeating units with at least two —C(=O)—N—C(=O)— functional groups or at least four —N—C(=O)— functional groups. Here, if the F content is above the stated range, the light loss characteristic of the polymer is bad.

The optimal conditions of the ICP etching process slightly change according to the F content in the polymer. Specifically, when the F content in the polymer is low, i.e., greater than or equal to 12 wt % and less than 25 wt %, ICP power is controlled within the range of approximately 170–1000 W, preferably within the range of approximately 350 to 650 W (i.e., 500±150 W ), and RF chuck power is within the range of approximately 30–310 W, preferably within the range of approximately 100 to 260 W (i.e., 180±80 W). If the optical waveguide is etched under such conditions, the etch rate may be greater than or equal to 500 nm/min, and even greater than or equal to 1500 nm/min, and uniform etching planes can be obtained in both horizontal and vertical directions.

When the F content in the polymer is greater than or equal to about 25 wt % and less than 37 wt %, ICP power is controlled within the range of approximately 190–750 W, preferably within the range of approximately 260 to 620 W (i.e., 440±180 W), and the RF chuck power is controlled within the range of approximately 20–340 W, preferably within the range of approximately 140 to 260 W (i.e.,200±60 W). If the optical waveguide is etched under such conditions, the etch rate may greater than or equal to 500 nm/min, and even greater than or equal to 2000 nm/min, and uniform etching planes can be obtained in both horizontal and vertical directions.

The settings for the pressure of the chamber and the flow rate of etching gas are the same irrespective of the F content in the polymer. The pressure of the chamber and the flow amount of the etching gas are preferably controlled to be 2–20 mtorr and 15–50 sccm (standard cubic centimeters per minute), respectively. And, the etch rate is preferably controlled to be greater than or equal to 500 nm/min.

FIG. 1 is a conceptual diagram of an inductively coupled plasma (ICP) etching device used in the present invention. Referring to FIG. 1, two RF power sources are employed in the ICP etching device, that is, RF chuck power source 12 and ICP power source 13. As seen from the FIG. 1, $RF_1$ is applied to chuck 10 on which etched subjected is displaced from RF chuck power source 12 and $RF_2$ is applied to RF coils 14 from ICP power source 13, respectively. If a voltage is applied to the RF coils from ICP power source 13, a magnetic field is induced along the flow of current. The thus-induced magnetic field changes the movement of electrons in the plasma. The electrons give rise to linear movement and spiral movement. Accordingly, collisions between electrons, atoms and ions occur more frequently. The plasma density increases due to collisions between electrons, and the number of ions, radicals (neutral atoms) and electrons increases in the plasma.

An etching process of a polymer optical waveguide according to a preferred embodiment of the present invention will now be described. An optical waveguide formed of polyimide represented by the formula 1 (F content:approx. 25 wt %),

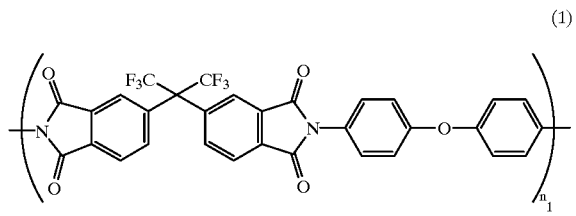

(1)

where $n_1$ is an integer between 50 and 300, was etched using an ICP etching method. Here, oxygen was used as an etching gas. Changes in etching characteristics of the optical waveguide depending on RF chuck power, ICP power, chamber pressure, a change in flow rates of the etching gas were observed. The result showed that the RF chuck power and the ICP power greatly affected the etching characteristics of the optical waveguide, but the chamber pressure and the flow rate hardly affected these characteristics.

First, in order to observe changes in etching characteristics of the optical waveguide depending on the ICP power, the ICP power was changed while the RF chuck power, the chamber pressure, the flow rate of oxygen were maintained at 150 W, 5 mtorr and 40 sccm, respectively. Changes in etch rates (▼) and ion energies (DC-bias) (○) depending on changes in the ICP power were observed and the results are shown in FIG. 2.

Figure 2:
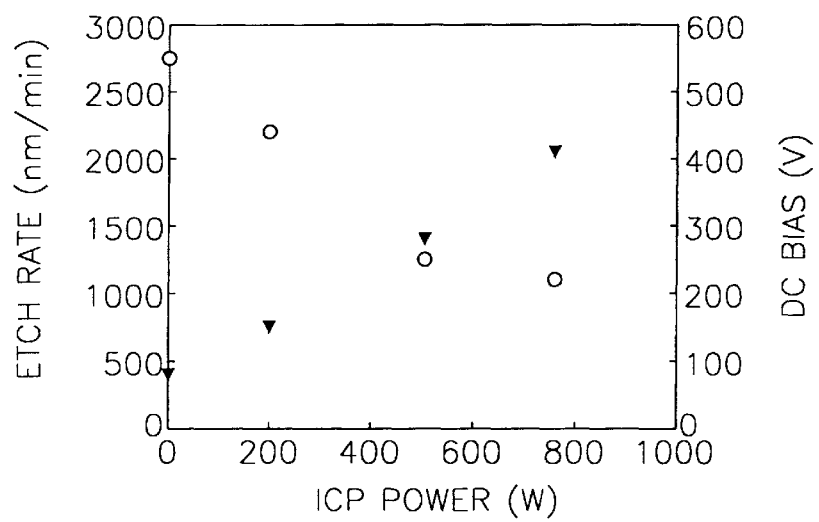
FIG. 2 illustrates the changes in the etch rate and ion energy (DC-bias) as a function of the ICP power, for a polymer according to an embodiment of the present invention.

Referring to FIG. 2, when the ICP power increased from 0 to 750 W, the etch rate increased linearly from 450 nm/min to 2160 nm/min. On the other hand, the DC-bias decreased from 551 V to 220 V. Observation of the states of the etched optical waveguide under various conditions showed that an optical waveguide having a good uniformity and vertical profile of the etched plane could be obtained when the ICP power was set to 500 W.

Next, in order to observe changes in etching characteristics of the optical waveguide depending on the RF chuck power, the RF chuck power was changed while the ICP power, the chamber pressure, the flow rate of oxygen were maintained at 500 W, 5 mtorr and 40 sccm, respectively. Changes in etch rates (▼) and ion energies (DC-bias) (○) depending on changes in the RF chuck power were observed and the results are shown in FIG. 3.

Figure 3:
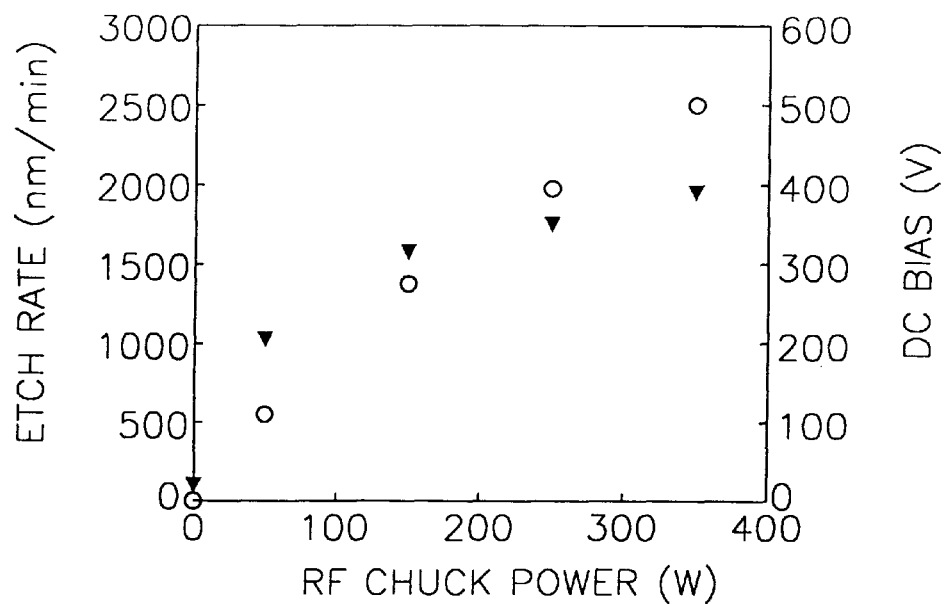
FIG. 3 illustrates the changes in the etch rate and ion energy (DC-bias) as a function of the RF chuck power for the polymer of FIG. 2.

Referring to FIG. 3, when the RF chuck power was increased from 0 to 50 W, 150 W, 250 W and 350 W, the etch rate increased linearly from 30 nm/min to 1060 nm/min, 1500 nm/min, 1735 nm/min and 1950 nm/min, respectively. The DC-bias increased linearly from 0 V to 500 V. Observation of the phases of the etched optical waveguide under various conditions showed that an optical waveguide having a good uniformity and vertical profile of the etched plane could be obtained when the RF chuck power was greater than or equal to 150 W.

An etching process of a polymer optical waveguide according to another embodiment of the present invention will now be described. An optical waveguide comprised of polyimide represented by the formula 2 (F content:approx. 37 wt %)

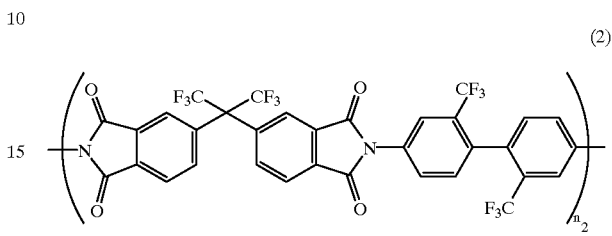

(2)

where $n_2$ is an integer between 40 and 200, was etched using an ICP etching method. Here, oxygen was used as an etching gas. Changes in etching characteristics of the optical waveguide depending on RF chuck power, ICP power, chamber pressure, a change in flow rates of the etching gas were observed. The result showed that the RF chuck power and the ICP power greatly affected the etching characteristics of the optical waveguide, but the chamber pressure and the flow rate hardly affected these characteristics.

First, in order to observe changes in etching characteristics of the optical waveguide depending on the ICP power, the ICP power was changed while the RF chuck power, the chamber pressure, the flow rate of oxygen were maintained at 150 W, 5 mtorr and 40 sccm, respectively. Changes in etch rates (▼) and ion energies (DC-bias) (○) depending on changes in ICP power were observed and the results are shown in FIG. 4.

Figure 4:
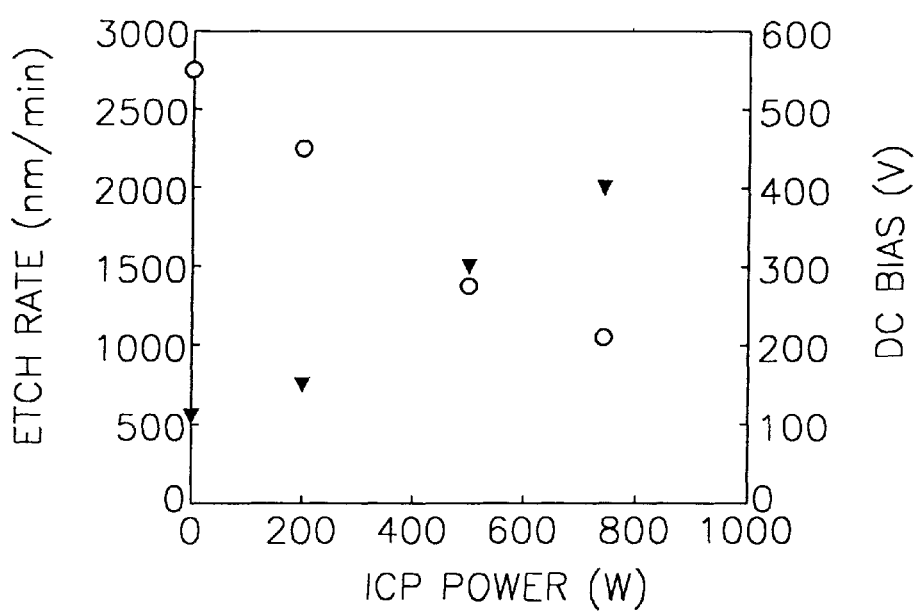
FIG. 4 illustrates the changes in the etch rate and ion energy (DC-bias) as a function of the ICP power, for a polymer according to an embodiment of the present invention.

Referring to FIG. 4, when the ICP power was increased from 0 to 750 W, the etch rate increased linearly from 540 nm/min to 2030 nm/min. On the other hand, the DC-bias decreased from 550 V to 220 V. Observation of the phases of the etched optical waveguide under various conditions showed that an optical waveguide having a good uniformity and vertical profile of the etched plane could be obtained when the ICP power was set to 500 W. Therefore, it was concluded that when the ICP power increased, the ion energy decreased while the etch rate increased. When the ion energy (DC-bias) was very large, the etching characteristic of the optical waveguide was poor, which is due to a damaged optical waveguide by the large ion energy (DC-bias).

Next, in order to observe changes in etching characteristics of the optical waveguide as a function of the RF chuck power, the RF chuck power was changed while the ICP power, the chamber pressure, the flow rate of oxygen were maintained at 500 W, 5 mtorr and 40 sccm, respectively. Changes in etch rates (▼) and ion energies (DC-bias) (○) depending on changes in the RF chuck power were observed and the results are shown in FIG. 5.

Figure 5:
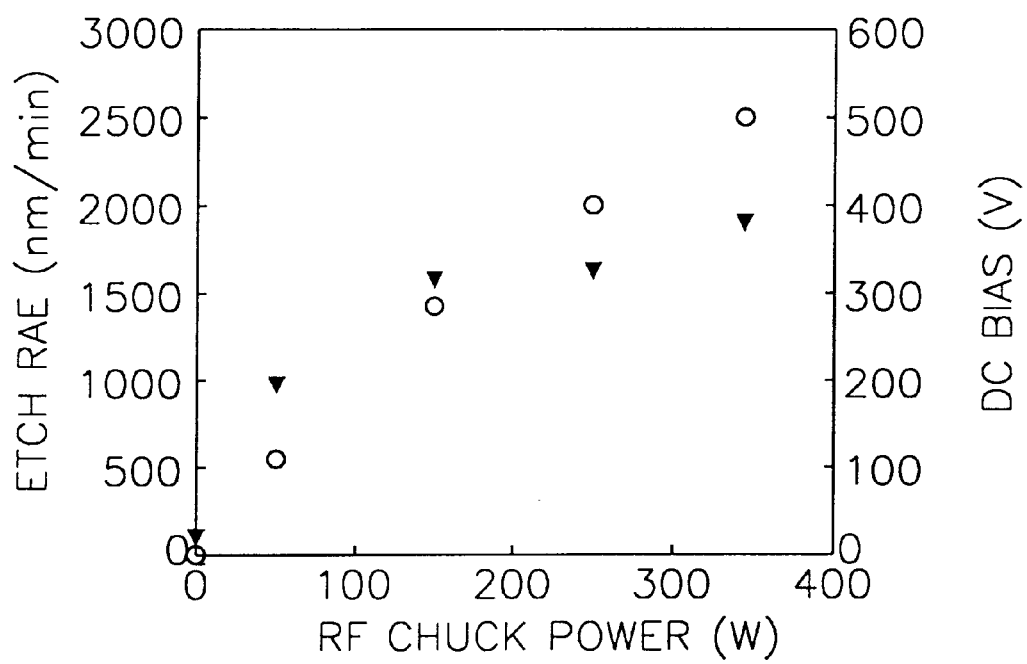
FIG. 5 illustrates the changes in the etch rate and ion energy (DC-bias) as a function of the RF chuck power, of the polymer of FIG. 4.

Referring to FIG. 5, when the RF chuck power was increased from 0 to 50 W, 150 W, 250 W and 350 W, the etch rate increased linearly from 30 nm/min to 980 nm/min, 1530 nm/min, 1620 mn/min and 1870 nm/min, respectively. The DC-bias increased linearly from 0 V to 500 V. Observation of the phases of the etched optical waveguide under various conditions showed that an optical waveguide having a good uniformity and vertical profile of the etched plane could be obtained when the RF chuck power was greater than or equal to 150 W.

It was found from the above result that the optical waveguide formed of polymer represented by the formula 1 or 2 was etched at a rate of 1500–2000 nm/min with the ICP power at 500 W and the RF chuck power at 150–300 W. Under these conditions there was little damage to the optical waveguide, and the uniformity of the etched plane was very good. The above-described embodiments have been described by way of examples only and the present invention is not limited thereto.

If a core layer is etched according to the ICP etching method of the present invention, the etch rate becomes at least three times faster than that of the conventional RIE etching method. Also, etching characteristics including uniformity of an etched plane and vertical profile of an etched plane are improved, thereby reducing damage to an optical waveguide. Thus, the light scattering loss of the optical waveguide can be minimized. The method for fabricating a polymer optical waveguide according to the present invention is useful for mass production of polymer optical waveguides.

What is claimed is:

1. An optical waveguide, comprising:
   a core comprising a first polymer, said first polymer comprising in the range of approximately 12 to 37% fluorine by weight, and said first polymer further comprising a repeating unit containing at least two —C(=O)—N—C(=O) functional groups, said core having a shape patterned by an inductively coupled plasma process; and
   a cladding in contact with said core, said cladding formed of a second polymer having a refractive index lower than that of said first polymer.

2. The optical waveguide of claim 1, said first polymer further comprising a repeating unit which is a polyimide, a polyetherimide, a polyesterimide, a polysulfoneimide or a polyamideimide.

3. The optical waveguide of claim 1, where said first polymer comprises a repeating unit of formula

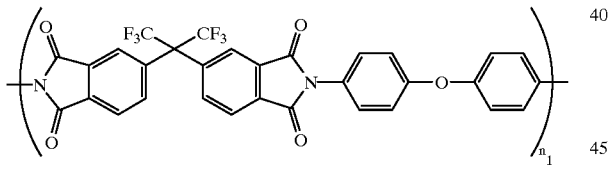

or where said first polymer comprises a repeating unit of formula

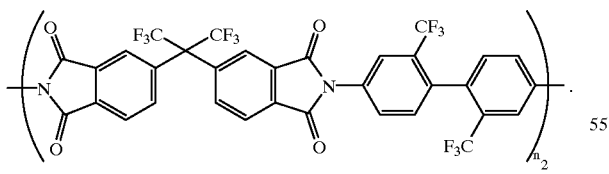

4. The optical waveguide of claim 3, where the molecules of said first polymer contain in the range of approximately 10 to 500 of said repeating unit.

5. The optical waveguide of claim 4, where the molecules of said first polymer contain in the range of approximately 50 to 500 of said repeating unit.

6. The optical waveguide of claim 3, where the molecules of said first polymer contain in the range of approximately 40 to 200 of said repeating unit.

7. The optical waveguide of claim 1, further comprising:
   a substrate;
   a lower cladding layer formed on said substrate as a portion of said cladding;
   said core being formed as a layer on said lower cladding layer; and
   an upper cladding layer being formed as a layer on said core as a portion of said cladding.

8. The optical waveguide of claim 7, further comprising:
   said inductively coupled plasma process using oxygen as an etching gas.

9. The optical waveguide of claim 7, further comprising:
   said core having a shape patterned by an inductively coupled plasma process with inductively coupled plasma power in the range of approximately 170 to 750 W and controlling radio frequency chuck power within the range of 20 to 340 W.

10. The optical waveguide of claim 9, further comprising:
    said fluorine content of the first polymer being in the range of approximately 12 to 25%; and
    said core having a shape patterned by an inductively coupled plasma process with inductively coupled plasma power in the range of approximately 350 to 650 W and controlling radio frequency chuck power within the range of 100 to 260 W.

11. The optical waveguide of claim 9, further comprising:
    said fluorine content of the first polymer being in the range of approximately 25 to 37%; and
    said core having a shape patterned by an inductively coupled plasma process with inductively coupled plasma power in the range of approximately 260 to 620 W and controlling radio frequency chuck power within the range of 140 to 260 W.

12. An optical waveguide, comprising:
    a core comprising a first polymer, said first polymer comprising in the range of approximately 12 to 37% fluorine by weight, and said first polymer further comprising a repeating unit containing at least four N—C(=O)— functional groups, said core having a shape patterned by an inductively coupled plasma process; and
    a cladding in contact with said core, said cladding formed of a second polymer having a refractive index lower than that of said first polymer.

13. The optical waveguide of claim 12, said first polymer further comprising, a repeating unit which is a polyimide, a polyetherimide, a polyesterimide, a polysulfoneimide or a polyamideimide.

14. The optical waveguide of claim 12, further comprising:
    a substrate;
    a lower cladding layer formed on said substrate as a portion of said cladding;
    said core being formed as a layer on said lower cladding layer; and
    an upper cladding layer being formed as a layer on said core as a portion of said cladding.

15. The optical waveguide of claim 14, further comprising:
    said inductively coupled plasma process using oxygen as an etching gas.

16. The optical waveguide of claim 14, further comprising:
    said core having a shape patterned by an inductively coupled plasma process with inductively coupled plasma power in the range of approximately 170 to 750 W and controlling radio frequency chuck power within the range of 20 to 340 W.

17. The optical waveguide of claim 16, further comprising:

said fluorine content of the first polymer being in the range of approximately 12 to 25%; and said core having a shape patterned by an inductively coupled plasma process with inductively coupled plasma power in the range of approximately 350 to 650 W and controlling radio frequency chuck power within the range of 100 to 260 W.

18. The optical waveguide of claim 16, further comprising:

said fluorine content of the first polymer being in the range of approximately 25 to 37%; and said core having a shape patterned by an inductively coupled plasma process with inductively coupled plasma power in the range of approximately 260 to 620 W and controlling radio frequency chuck power within the range of 140 to 260 W.

* * * * *